000

United States Patent
Tadokoro

(10) Patent No.: US 9,871,424 B2
(45) Date of Patent: Jan. 16, 2018

(54) ELECTRIC TOOL

(71) Applicant: HITACHI KOKI CO., LTD., Tokyo (JP)

(72) Inventor: Naoki Tadokoro, Ibaraki (JP)

(73) Assignee: HITACHI KOKI CO., LTD., Tokyo (JP)

(*) Notice: Subject to any disclaimer, the term of this patent is extended or adjusted under 35 U.S.C. 154(b) by 160 days.

(21) Appl. No.: 14/763,781

(22) PCT Filed: Jan. 31, 2014

(86) PCT No.: PCT/JP2014/052275
§ 371 (c)(1),
(2) Date: Jul. 27, 2015

(87) PCT Pub. No.: WO2014/123070
PCT Pub. Date: Aug. 14, 2014

(65) Prior Publication Data
US 2015/0364973 A1 Dec. 17, 2015

(30) Foreign Application Priority Data

Feb. 6, 2013 (JP) .................................. 2013-021522

(51) Int. Cl.
*H02K 7/14* (2006.01)
*H01K 9/00* (2006.01)
(Continued)

(52) U.S. Cl.
CPC .............. *H02K 7/145* (2013.01); *B25F 5/008* (2013.01); *H02K 5/04* (2013.01); *H02K 9/02* (2013.01); *H02K 11/044* (2013.01); *H02K 11/33* (2016.01)

(58) Field of Classification Search
CPC .................................. H02K 11/33; B25F 5/00
(Continued)

(56) References Cited

U.S. PATENT DOCUMENTS 6,127,751 A 10/2000 Kristen et al.
6,543,549 B1 4/2003 Riedl et al.
(Continued)

FOREIGN PATENT DOCUMENTS

CN 1249225 A 4/2000
CN 1487650 4/2004
(Continued)

OTHER PUBLICATIONS

International Search Report for PCT/JP2014/052275 dated Mar. 18, 2014.
(Continued)

*Primary Examiner* — Jose Gonzalez Quinones
(74) *Attorney, Agent, or Firm* — Kenealy Vaidya LLP

(57) ABSTRACT

In the present invention, a housing having a trunk part accommodating therein a brushless motor and an output part to which a tip tool is to be connected, a handle part having one end connected to the trunk part, and an accommodation part provided at an other end of the handle part is used, and a FET serving as a switching element that supplies power to the motor is accommodated in the accommodation part from which a power supply cord is pulled out. It is possible to reduce the length of the trunk part in the front-rear direction compared to a case where the FET is disposed in the front-rear direction of the motor.

7 Claims, 5 Drawing Sheets

(51) Int. Cl.
*B25F 5/00* (2006.01)
*H02K 5/04* (2006.01)
*H02K 9/02* (2006.01)
*H02K 11/04* (2016.01)
*H02K 11/33* (2016.01)

(58) Field of Classification Search
USPC ........ 310/50, 58, 59, 60 R; 173/20; 408/125
See application file for complete search history.

(56) References Cited

U.S. PATENT DOCUMENTS

| | | |
|---|---|---|
| 2004/0124721 A1 | 7/2004 | Pfisterer et al. |
| 2004/0226731 A1 | 11/2004 | Faatz et al. |
| 2008/0290745 A1 | 11/2008 | Riedl |
| 2009/0145621 A1 | 6/2009 | Lau et al. |
| 2009/0229957 A1 | 9/2009 | Nishimiya et al. |
| 2009/0245958 A1 | 10/2009 | Lau et al. |
| 2011/0180286 A1 | 7/2011 | Oomori et al. |
| 2012/0014065 A1* | 1/2012 | Haga ................ B25B 21/002 361/697 |
| 2013/0000934 A1 | 1/2013 | Tadokoro et al. |

FOREIGN PATENT DOCUMENTS

| | | |
|---|---|---|
| CN | 101310937 A | 11/2008 |
| CN | 102046335 A | 5/2011 |
| DE | 10 2007 000 290 A1 | 11/2008 |
| EP | 0 241 633 A1 | 10/1987 |
| EP | 1 398 865 A2 | 3/2004 |
| EP | 2 471 633 A2 | 7/2012 |
| EP | 2471633 A2 * 7/2012 ............. B25B 21/00 |
| JP | 2004-98282 A | 4/2004 |
| JP | 2007-283447 A | 11/2007 |
| JP | 2009-137011 A | 6/2009 |
| JP | 2009-214260 A | 9/2009 |
| JP | 2009-241251 A | 10/2009 |
| JP | 2009-285787 A | 12/2009 |
| JP | 2010-12585 A | 1/2010 |
| JP | 2010-58186 A | 3/2010 |
| JP | 2012-139747 A | 7/2012 |
| WO | WO 2009145206 A2 * 12/2009 ............. B25F 5/008 |
| WO | 2010/035563 A1 | 4/2010 |

OTHER PUBLICATIONS

Japanese Office Action for the related Japanese Patent Application No. 2014-560747 dated Jul. 6, 2016.
The extended European search report for the related European Patent Application No. 14749324.1 dated Aug. 3, 2016.
Chinese Office Action for the related Chinese Patent Application No. 201480006235.X dated Aug. 29, 2016.
Written Opinion of the International Search Report for JP2014/052275 dated Mar. 18, 2014.

* cited by examiner

ELECTRIC TOOL

This application is a U.S. national phase filing under 35 U.S.C. §371 of PCT Application No. PCT/JP2014/052275, filed Jan. 31, 2014, and which in turn claims priority under 35 U.S.C. §119 to Japanese Patent Application No. JP2013-021522, filed Feb. 6, 2013, the entireties of which are incorporated by reference herein.

TECHNICAL FIELD

The invention relates to an electric tool using a commercial alternating current power supply, and more particularly, to an electric tool that supplies power to a motor through a switching element.

BACKGROUND ART

Conventionally, an electric tool driven by power supplied from a commercial alternating current power supply to a commutator motor, for example, an impact driver has been known. Also, in recent years, an electric tool in which a brushless motor is used as the motor and a rotation number of the motor can be precisely controlled by a microcomputer mounted on a control board has been suggested in Patent Document 1, for example.

PRIOR ART DOCUMENTS

Patent Documents

[Patent Document 1] JP-A-2012-139747

FIG. 6 illustrates a conventional electric tool shown in Patent Document 1, which is an impact driver including a housing 1, a brushless motor 10, a striking mechanism part 20 that is rotated by the motor 10 and an output part 30 connected to the striking mechanism part 20 (front-rear direction and upper-lower directions are defined in FIG. 6).

The housing 1 has a trunk part 2 accommodating therein the motor 10, the striking mechanism part 20 and a portion of the output part 30, a handle part 3 having one end connected to the trunk part 2 and an accommodation part 4 formed at an other end of the handle part 3. The handle part 3 is provided with a trigger 5, and the trigger 5 is connected to a switch mechanism 6 accommodated in the handle part 3. By the trigger 5, the supplying and shutoff of the power with respect to the motor 10 are switched.

A power supply cord 40 is pulled out from a lower part of the accommodation part 4, a rectification circuit board 50, which is connected to the power supply cord 40 and on which a rectification circuit that converts alternating current power into direct current power is mounted, is accommodated in the accommodation part 4, and a control circuit board 60, on which a control circuit that controls rotation of the motor 10 and the like is mounted, is also accommodated in the accommodation part 4. A noise filter configured by a choke coil 41 and a capacitor 42 is inserted between the power supply cord 40 and the rectification circuit, and the noise filter is accommodated in the handle part 3.

An inverter circuit that is controlled by the control circuit is mounted on an inverter circuit board 70 arranged at the rear of the motor 10. The inverter circuit has six FETs 71 serving as switching elements that turns on and off energization to the motor 10, and each FET 71 is configured to be cooled by an air stream generated by a fan 15 that rotates together with the motor 10.

SUMMARY OF THE INVENTION

Problems to be Solved

As shown in FIG. 6, since the conventional electric tool is driven by commercial alternating current power and power that is treated by the FETs 71 is high, the respective FETs 71 are arranged at the backside of the motor 10 with respect to an axis direction. Although the corresponding arrangement is effective in cooling the FETs 71 by the air stream generated by the fan 15 that rotates together with the motor 10, a length of the trunk part 2 of the housing 1 in the front-rear direction tends to increase in order to secure an arrangement space of the FETs 71.

It is therefore an object of the present invention to provide an electric tool capable of reducing a length of a trunk part of a housing, in which a motor and the like are to be accommodated, in a front-rear direction by accommodating a switching element that supplies power to the motor in an accommodation part positioned at an opposite side to the trunk part of the housing.

Means for Solving the Problems

An aspect of the present invention relates to an electric tool. The electric tool includes a motor, an output part driven by the motor and to which a tip tool is to be connected, a housing having a trunk part accommodating therein the motor, a handle part having one end connected to the trunk part and an accommodation part provided at an other end of the handle part, and a power supply cord pulled out from the accommodation part, characterized in that a switching element that supplies power to the motor is accommodated in the accommodation part.

In the above aspect, it is preferable that a control circuit board is accommodated in the accommodation part, a control circuit is mounted on one side of the control circuit board and the switching element is mounted on an other side of the control circuit board.

In the above aspect, it is preferable that a push button is mounted on the one side of the control circuit board together with the control circuit, and the push button is exposed from the accommodation part.

In the above aspect, it is preferable that the control circuit and the switching element are electrically connected to each other by a wiring pattern of the control circuit board.

In the above aspect, it is preferable that a rectification circuit board, on which a rectification circuit that converts alternating current power supplied from the power supply cord into direct current power is mounted, is accommodated in the accommodation part.

In the above aspect, it is preferable that a ventilating window part serving as an intake hole is provided at a portion of the accommodation part.

In the above aspect, it is preferable that an air stream introduced from the ventilating window part passes through between the rectification circuit board and the control circuit board.

In the above aspect, it is preferable that the ventilating window part is provided at a front side of the accommodation part that protrudes more forwards than the other end of the handle part.

In the above aspect, it is preferable that a coil and a capacitor configuring a noise filter may be accommodated in the handle part, and the air stream introduced from the ventilating window part may pass through the accommodation part, then pass a periphery of the coil and capacitor in the handle part and reach the motor in the trunk part.

In the meantime, any combination of the above constitutional elements and a method, a system and the like converted from the expression of the present invention are also effective as the aspects of the present invention.

Effects of the Invention

According to the electric tool of the present invention, by using the housing having the trunk part accommodating therein the motor, the handle part having one end connected to the trunk part and the accommodation part provided at the other end of the handle part, and by accommodating the switching element that supplies power to the motor in the accommodation part, it is possible to reduce a length of the trunk part in a front-rear direction and to improve workability in a narrow space.

DETAILED DESCRIPTION OF EMBODIMENTS

Figure 1:
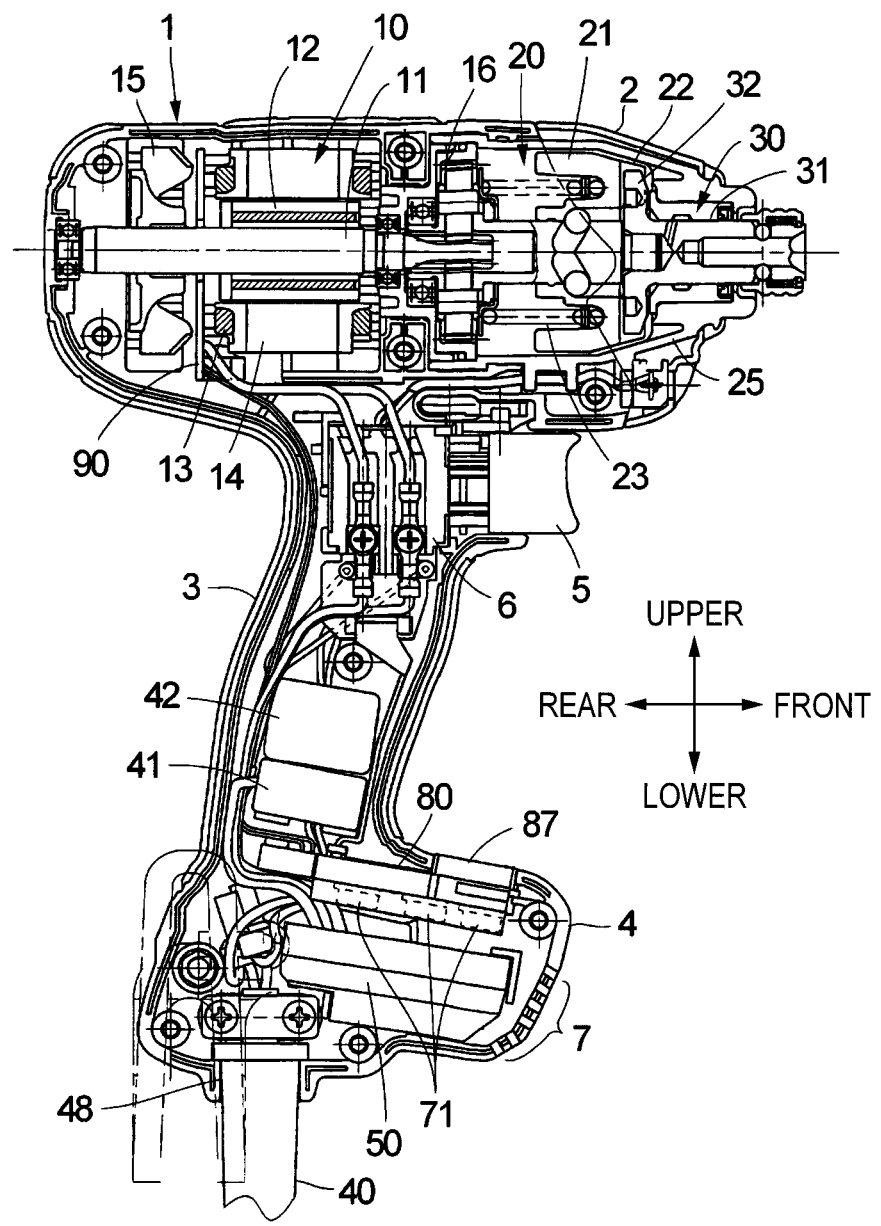
FIG. 1 is a side sectional view illustrating an impact driver according to an embodiment of the electric tool of the present invention.

Hereinafter, preferred embodiments of the invention will be described with reference to the drawings. In the meantime, the same or equivalent constitutional elements, members and the like shown in the respective drawings are denoted with the same reference numerals, and the overlapping descriptions thereof are appropriately omitted. Also, the embodiments are exemplary and do not limit the present invention, and all features described in the embodiments and combinations thereof are not necessarily the essentials of the present invention.

Figure 6:
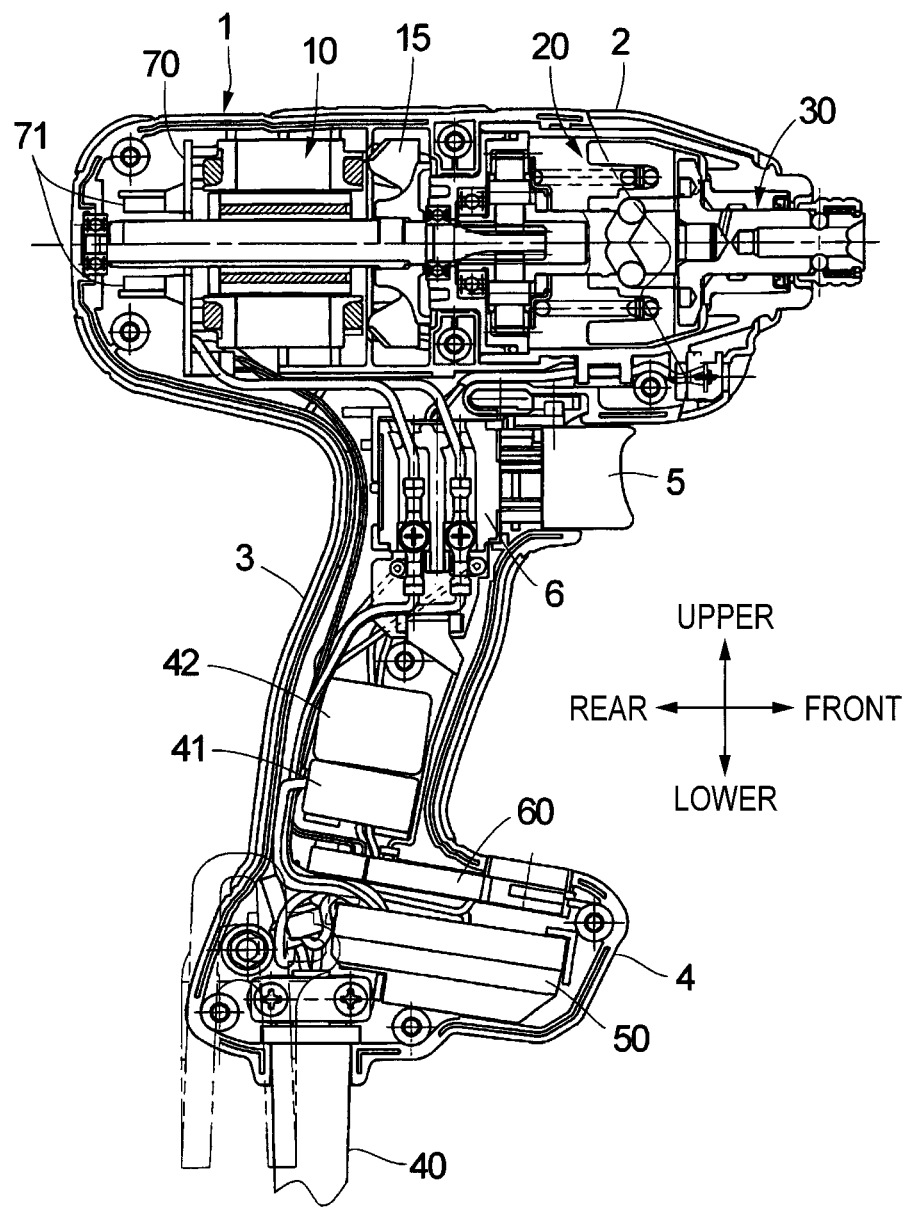
FIG. 6 is a side sectional view illustrating a conventional example.

In FIGS. 1 to 4, an impact driver is described as an embodiment of the electric tool of the present invention (the front-rear and upper-lower directions are defined in FIG. 1). The impact driver is different from the conventional example of FIG. 6 with respect to an arrangement of an inverter circuit, as described later.

As shown in FIGS. 1 to 4, a housing 1 has a trunk part 2 accommodating therein a brushless motor 10, a striking mechanism part 20 and a portion of an output part 30, a handle part 3 having one end connected to the trunk part 2 and an accommodation part 4 formed at an other end of the handle part 3.

The brushless motor 10 has an output shaft 11 extending in the front-rear direction, a rotor 12 fixed to the output shaft 11 and having a plurality of permanent magnets, a stator 14 disposed to surround the rotor 12 and having a plurality of stator coils 13, and a cooling fan 15 fixed to the output shaft 11. Both sides of the output shaft 11 are shaft-supported (supported by a bearing), and the stator 14 is fixed to the trunk part 2-side of the housing 1. Rotation of the output shaft 11 is decelerated through a planetary gear mechanism 16 and is then applied to a hammer 21 of the striking mechanism part 20.

The striking mechanism part 20 has the hammer 21 disposed in a hammer case 25 and a spring 23 that urges the hammer forwards. The hammer 21 has a striking part 22 at a front side end thereof and is rotated by an output shaft of the planetary gear mechanism 16. An anvil 31 configuring the output part 30 has a struck part 32 at a rear end thereof. Also, the hammer 21 is urged forwards by the spring 23 so that the striking part 22 collides with the struck part 32 in a rotating direction upon the rotation. By this configuration, when the hammer 21 is rotated, the striking is applied to the anvil 31 of the output part 30. Also, the hammer 21 is configured to be moveable rearwards against the urging force of the spring. After the striking part 22 and the struck part 32 collide with each other, the hammer 21 is retreated while rotating against the urging force of the spring 23. When the striking part 22 gets over the struck part 32, the elastic energy accumulated in the spring 23 is released, so that the hammer 21 is moved forwards and the striking part 22 again collides with the struck part 32.

The anvil 31 configuring the output part 30 is rotatably shaft-supported at a tip portion of the trunk part 2, i.e., at the front end-side of the hammer case 25. A tip tool can be detachably mounted to the anvil 31.

The handle part 3 is provided with a trigger 5. The trigger 5 is connected to a switch mechanism 6 accommodated in the handle part 3. By the trigger 5, the supplying and shutoff of the power with respect to the motor 10 are switched.

A power supply cord 40 is pulled out from a lower part of the accommodation part 4, and a rectification circuit board 50, which is connected to the power supply cord 40 and on which a rectification circuit that converts alternating current power into direct current power is mounted, and a control circuit board 80, on which both a control circuit that controls the motor 10 and an inverter circuit are mounted, are accommodated in the accommodation part 4.

Figure 3:
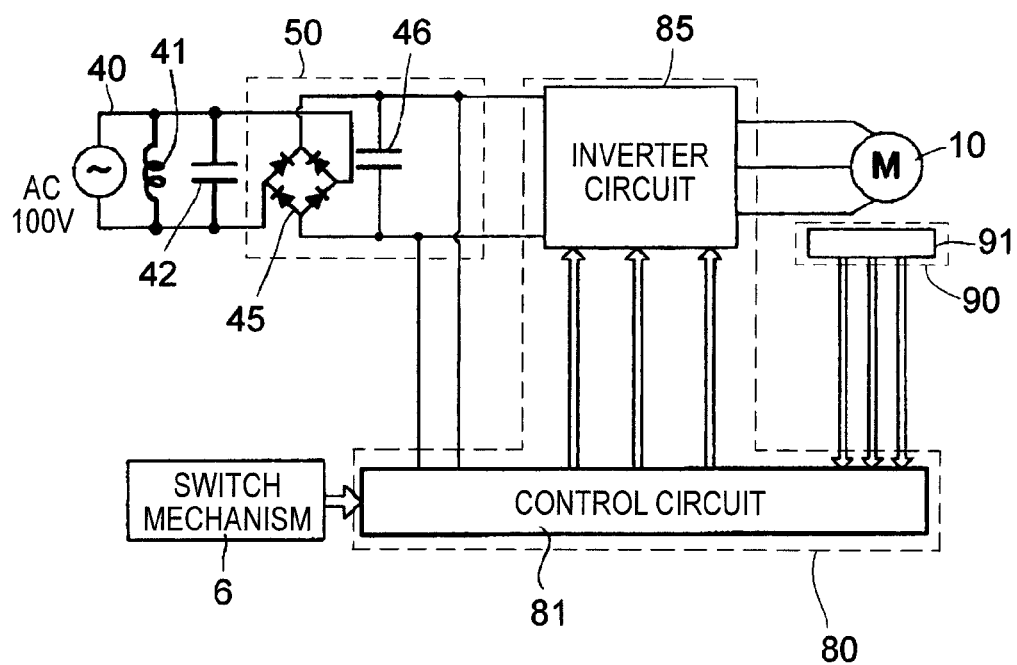
FIG. 3 is a control block diagram according to the embodiment.

As shown in FIG. 3, the rectification circuit mounted on the rectification circuit board 50 has a diode bridge 45 and a smoothing capacitor 46 for full-wave rectifying commercial alternating current power supply (AC 100V) that is supplied from the power supply cord 40. Also, a noise filter having a choke coil 41 and a capacitor 42 is inserted at an alternating current input-side of the diode bridge 45, and the noise filter is accommodated in the handle part 3. A direct current output voltage from the rectification circuit is supplied to a control circuit 81 including a microcomputer and the like mounted on the control circuit board 80 and an inverter circuit 85 having FETs (for example, six FETs) serving as switching elements that supply power to the motor 10.

A rotation detection board 90 has three Hall elements 91 so as to detect a position of the rotor 12 of the motor 10, which are disposed at an interval of 60°. The rotation detection board 90 is fixedly disposed at the rear of the motor 10 (between the motor 10 and the fan 15) shown in FIG. 1. A rotation detection output of each Hall element 91 is input to the control circuit 81. Also, an output of the switch mechanism 6 operated by the trigger 5 is input to the control circuit 81.

Figure 4:
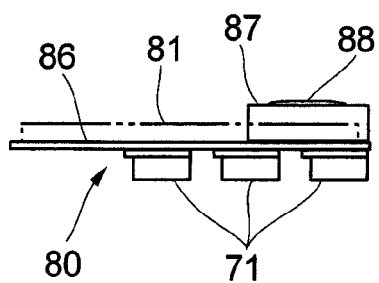
FIG. 4 illustrates a wiring board having a control circuit and an inverter circuit mounted thereon according to the embodiment.

FIG. 4 schematically illustrates a configuration of the control circuit board 80. The control circuit 81 is mounted on an upper surface of a double-side wiring board 86, and the FETs 71 serving as the switching elements are mounted on a lower surface of the double-side wiring board 86. The control circuit 81 and the inverter circuit 85 including the FETs 71 are electrically connected to each other by a wiring pattern of the double-side wiring board 86. Also, although not shown, the upper and lower surfaces of the double-side wiring board 86 are molded by an insulating resin having a favorable thermal conductivity. When the switch mechanism 6 is operated by the trigger 5, the control circuit 81 turns on and off the respective FETs 71 of the inverter circuit 85, based on the detection outputs of the rotor positions by the respective Hall elements 91, thereby rotating the rotor 12 at a predetermined rotating speed in a predetermined direction.

As shown in FIG. 1, the control circuit board 80 is provided with a striking force display panel 87 exposed on the upper surface of the accommodation part 4. As shown in FIG. 4, the striking force display panel 87 has a push button 88. The push button 88 is a striking force switching button for switching a motor rotation number, a mode switching button for switching a continuous driving and an intermittent driving of the motor 10, or the like, for example.

As shown in FIG. 1, a pull-out opening 48 of the power supply cord 40, the rectification circuit board 50 and the control circuit board 80 are arranged in corresponding order from the lower in the accommodation part 4 of the housing 1, and a gap serving as an air stream passage for heat radiation is formed between the rectification circuit board 50 and the control circuit board 80. The FETs 71 are disposed to face the rectification circuit board 50 (i.e., to face the air stream passage). A ventilating window part 7 having a plurality of intake holes is provided at a front side of the accommodation part 4 protruding more forwards than the other end of the handle part 3. Although not shown, a ventilating window part having a plurality of exhaust holes is provided at a rear side of the trunk part 2. As shown with a thick arrow in FIG. 2, when the fan 15 is rotated, the air stream introduced into the accommodation part 4 from the ventilating window part 7 passes through a periphery of the rectification circuit board 50 and the gap between the rectification circuit board 50 and the control circuit board 80, passes through the inside of the handle part 3 while passing a periphery of the choke coil 41 and the capacitor 42 configuring the noise filter, passes between the rotor 12 and the stator 14 of the motor 10 and is then discharged to the external from the ventilating window part provided at the rear side of the trunk part 2. The ventilating window part 7 is provided at the front side of the accommodation part 4, so that it is possible to effectively cool the rectification circuit board 50 and the FETs 71 mounted on the control circuit board 80. Also, since the air stream passes through the inside of the handle part 3, it is possible to also cool the choke coil 41 and the capacitor 42.

Next, overall operations as the impact driver will be described. When the power supply cord 40 is connected to the commercial alternating current power supply (not shown), the driving power is supplied to the control circuit 81, so that the striking force display panel 87 is lighted. At this state, when an operator pulls the trigger 5, the motor 10 is rotated at a rotation number corresponding to a pulling amount thereof. At the same time, the cooling fan 15 is also rotated, so that the external air is introduced from the ventilating window part 7. The external air cools the rectification circuit board 50, the control circuit board 80 including the FETs 71 and the motor 10 along the path shown in FIG. 2 and is then discharged to the external from the rear side of the trunk part 2. As the motor 10 is rotated, the hammer 21 of the striking mechanism part 20 strikes the anvil 31 of the output part 30, so that the tip tool held by the anvil is rotated. When the operator releases the trigger 5, the motor 10 is stopped.

According to the embodiment, following effects can be accomplished.

(1) By using the housing 1 having the trunk part 2 accommodating therein the motor 10, the handle part 3 having one end connected to the trunk part 2 and the accommodation part 4 provided at the other end of the handle part 3, and by accommodating the FETs 71 serving as the switching elements that supply the power to the motor 10 in the accommodation part 4, it is possible to reduce a length of the trunk part 2 in the front-rear direction and to improve the workability in a narrow space.

(2) Since the control circuit board 80 is accommodated in the accommodation part 4, the control circuit 81 is mounted on one side of the control circuit board 80 and the FETs 71 are mounted on the other side of the control circuit board 80, a board area of the control circuit board 80 is not increased. In case of the electric tool using the commercial alternating current power supply, the using power is higher and a shape of the FET 71 is also enlarged, as compared to a battery driving-type electric tool. However, since the FETs 71 are mounted by using the board surface opposite to the control circuit 81, it is possible to save space.

Figure 2:
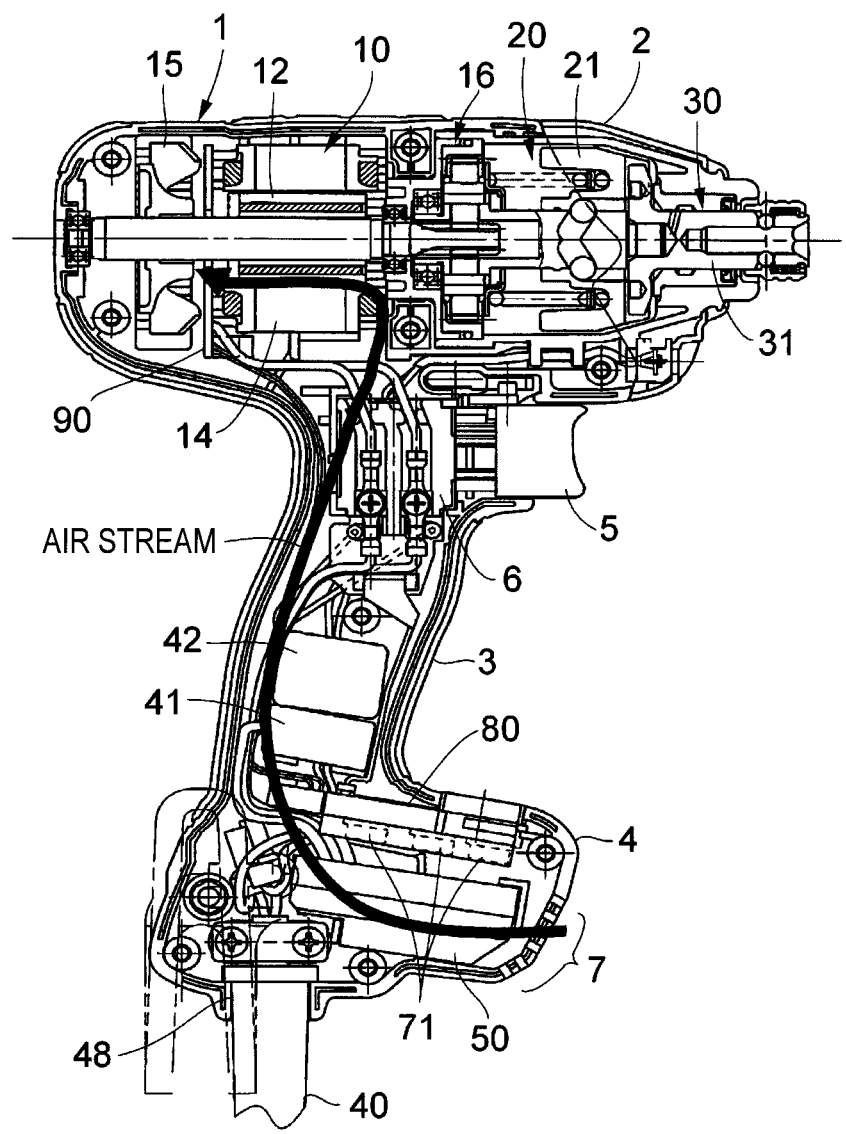
FIG. 2 is a side sectional view illustrating an air stream in a housing according to the embodiment.

(3) Since the rectification circuit board 50, on which the rectification circuit that converts the alternating current power supplied from the power supply cord 40 into the direct current power is mounted, is accommodated in the accommodation part 4, the ventilating window part 7 serving as an intake hole is provided at a portion (front side) of the accommodation part 4 and the air stream introduced from the ventilating window part 7 passes through between the rectification circuit board 50 and the control circuit board 80, it is possible to effectively cool the FETs 71 mounted on the control circuit board 80. Also, as shown in FIG. 2, the air stream flows rearwards from the front in the accommodation part 4 and then flows upwards from the lower in the handle part 3, so that the choke coil 41 and the capacitor 42 configuring the noise filter can also be cooled. Further, the air stream having passed through the handle part 3 passes through between the rotor 12 and the stator 14 of the motor 10 in the trunk part 2 from the front towards the rear, thereby cooling the motor 10. As shown in FIG. 2, the air stream tortuously passes through the inside of the housing 1 in a substantially Z shape, thereby cooling a wide range of the components.

(4) In the conventional case, since the inverter circuit board is disposed at the rear of the motor separately from the control circuit board, a plurality of wirings between the control circuit board and the inverter circuit board needs to pass through a cramped space in the handle part 3, it is disadvantageous for making a diameter of the handle part 3 to be small so as to be able to easily grip the same. However, according to the embodiment, since the control circuit 81 and the inverter circuit 85 including the FETs 71 are electrically connected to each other by the wiring pattern of the control circuit board 80, it is possible to reduce the number of wirings passing through the inside of the handle part 3.

Figure 5:
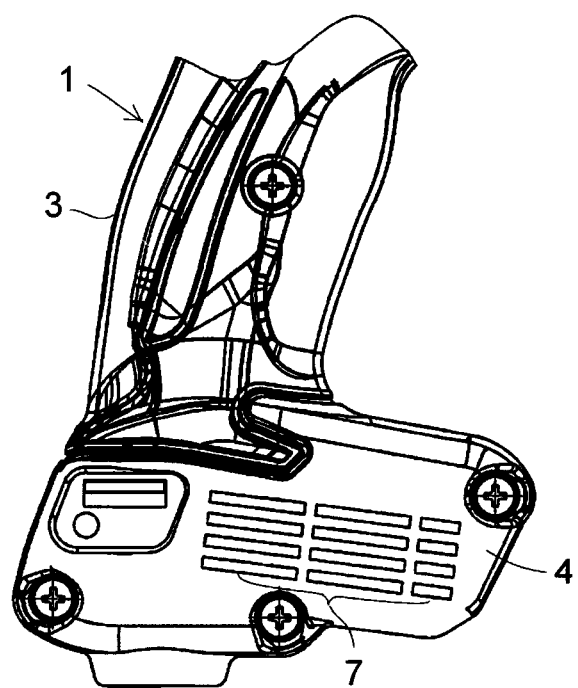
FIG. 5 is a side view illustrating another embodiment.

FIG. 5 illustrates another embodiment of the present invention. In this case, the arrangement of the ventilating window part 7 having the plurality of intake holes is different. That is, the ventilating window part 7 is provided on a side surface of the accommodation part 4 of the housing 1. The other configurations can be the same as the embodiment shown in FIG. 1 and the like.

Also in the embodiment shown in FIG. 5, the air stream introduced into the accommodation part 4 from the ventilating window part 7 passes through between the rectification circuit board and the control circuit board while cooling the periphery of the rectification circuit board, thereby cooling the FETs mounted on the control circuit board.

Although the present invention has been described with reference to the embodiments, it is obvious to one skilled in the art that the respective constitutional elements and respective processes of the embodiments can be variously modified within the scope defined in the claims. Hereinafter, modified embodiments will be described.

In the embodiment of FIG. 1, the ventilating window part 7 is provided at the front side of the accommodation part 4, and in the embodiment of FIG. 5, the ventilating window part 7 is provided on the side surface of the accommodation part 4. However, the ventilating window part 7 may be provided at both the front side and the side surface of the accommodation part 4.

In the respective embodiments, the impact driver has been exemplified as the electric tool. However, the present invention is not limited to the impact driver inasmuch as an electric tool has a motor mounted thereon and is driven by the alternating current power supply. For example, the present invention can also be applied to a driver drill having a clutch, a hammer drill having a reciprocating striking mechanism, an oil pulse driver having a hydraulic striking mechanism part, and the like.

DESCRIPTION OF REFERENCE NUMERALS

1: Housing
2: Trunk part
3: Handle part
4: Accommodation part
5: Trigger
6: Switch mechanism
7: Ventilating window part
10: Brushless motor
15: Fan
20: Striking mechanism part
30: Output part
40: Power supply cord
50: Rectification circuit board
60, 80: Control circuit board
70: Inverter circuit board
71: FET
81: Control circuit
85: Inverter circuit
86: Double-side wiring board
87: Striking force display panel
90: Rotation detection board
91: Hall element

The invention claimed is:

1. An electric tool comprising:
a motor;
an output part driven by the motor and to which a tip tool is to be connected, the output part being provided at a front side of the motor;
a housing having a trunk part accommodating therein the motor, a handle part extending downwardly from the trunk part and having one end connected to the trunk part and an accommodation part provided at an other end of the handle part, and
a power supply cord pulled out from the accommodation part,
wherein a switching element that supplies power to the motor is accommodated in the accommodation part,
wherein a ventilating window part serving as an intake hole is provided at a portion of the accommodation part, and
wherein the ventilating window part is provided at a front side of the accommodation part that protrudes more forwards than the other end of the handle part.

2. The electric tool according to claim 1, wherein a control circuit board is accommodated in the accommodation part, a control circuit is mounted on one side of the control circuit board and the switching element is mounted on an other side of the control circuit board.

3. The electric tool according to claim 2, wherein a push button is provided on the one side of the control circuit board together with the control circuit, and the push button is exposed from the accommodation part.

4. The electric tool according to claim 2, wherein the control circuit and the switching element are electrically connected to each other by a wiring pattern of the control circuit board.

5. The electric tool according to claim 1, wherein a rectification circuit board, on which a rectification circuit that converts alternating current power supplied from the power supply cord into direct current power is mounted, is accommodated in the accommodation part.

6. The electric tool according to claim 2, wherein a rectification circuit board, on which a rectification circuit that converts alternating current power supplied from the power supply cord into direct current power is mounted, is accommodated in the accommodation part, a ventilating window part serving as an intake hole is provided at a portion of the accommodation part, and an air stream introduced from the ventilating window part passes through between the rectification circuit board and the control circuit board.

7. The electric tool according to claim 1, wherein a coil and a capacitor configuring a noise filter are accommodated in the handle part, and an air stream introduced from the ventilating window part passes through the accommodation part, then passes a periphery of the coil and capacitor in the handle part and reaches the motor in the trunk part.

* * * * *